US012793738B2

(12) United States Patent
Wang et al.

(10) Patent No.: US 12,793,738 B2
(45) Date of Patent: Nov. 10, 2026

(54) METHOD, APPARATUS, DEVICE AND STORAGE MEDIUM FOR RECOMMENDING A MULTIMEDIA EDITING RESOURCE

(71) Applicant: Beijing Zitiao Network Technology Co., Ltd., Beijing (CN)

(72) Inventors: Shihan Wang, Beijing (CN); Xinghua Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 7 days.

(21) Appl. No.: 18/877,915

(22) PCT Filed: Dec. 6, 2023

(86) PCT No.: PCT/CN2023/136881
§ 371 (c)(1),
(2) Date: Dec. 20, 2024

(87) PCT Pub. No.: WO2024/140088
PCT Pub. Date: Jul. 4, 2024

(65) Prior Publication Data

US 2025/0378851 A1 Dec. 11, 2025

(30) Foreign Application Priority Data

Dec. 29, 2022 (CN) ........................ 202211714249.X

(51) Int. Cl.
*G11B 27/00* (2006.01)
*G06F 3/04845* (2022.01)
(Continued)

(52) U.S. Cl.
CPC ........ *G11B 27/031* (2013.01); *G06F 3/04845* (2013.01)

(58) Field of Classification Search
CPC ....... G11B 27/00; G11B 27/10; G11B 27/031; H04N 7/18
(Continued)

(56) References Cited

U.S. PATENT DOCUMENTS 9,639,634 B1 * 5/2017 Greene ............... G06F 16/7837
2017/0243611 A1 * 8/2017 Buyuklu ............. G11B 27/036

FOREIGN PATENT DOCUMENTS

CN 109299445 A 2/2019
CN 112948951 A 6/2021
(Continued)

OTHER PUBLICATIONS

International Patent Application No. PCT/CN2023/136881; Int'l Search Report; dated Feb. 27, 2024; 2 pages.

*Primary Examiner* — Daquan Zhao
(74) *Attorney, Agent, or Firm* — BakerHostetler

(57) ABSTRACT

The disclosure provides a method, apparatus, device, and storage medium for recommending a multimedia editing resource. The method includes: first, in response to a recommendation trigger operation in a first resource recommendation scenario, determining a recommendation analysis object corresponding to the first resource recommendation scenario; then, determining at least one recommendation tag by analyzing multimedia resources corresponding to the recommendation analysis object, and then obtaining a multimedia editing resource that matches the at least one recommendation tag, and displaying the multimedia editing resource, wherein the multimedia editing resource is configured to edit initial multimedia resources to obtain target multimedia resources, and the target multimedia resources are presented with an editing effect obtained by applying the multimedia editing resource to the initial multimedia resources. Embodiments of the disclosure can sup-
(Continued)

port the function of recommending a multimedia editing resource to creators in the multimedia resource editing scenario.

20 Claims, 3 Drawing Sheets

(51) Int. Cl.
*G11B 27/031* (2006.01)
*G11B 27/10* (2006.01)

(58) Field of Classification Search
USPC ......................... 386/278, 280, 282, 239, 248
See application file for complete search history.

(56) References Cited

FOREIGN PATENT DOCUMENTS

| | | | |
|---|---|---|---|
| CN | 113473019 | A | 10/2021 |
| CN | 114201626 | A | 3/2022 |
| WO | WO 2022/262680 | A1 | 12/2022 |

* cited by examiner

METHOD, APPARATUS, DEVICE AND STORAGE MEDIUM FOR RECOMMENDING A MULTIMEDIA EDITING RESOURCE

This application claims priority to Chinese Patent Application No. 202211714249.X, entitled "method, apparatus, device and storage medium for recommending a multimedia editing resource", filed on Dec. 29, 2022, the entirety of which is incorporated herein by reference.

FIELD

The present disclosure relates to the field of data processing, and more particularly to a method, apparatus, device and storage medium for recommending a multimedia editing resource.

BACKGROUND

With continuous development of Internet technology, the amount of information that can be obtained through Internet is increasing. When creators edit multimedia resources, they need to screen out required multimedia editing resources from massive data, which is time-consuming and laborious, affecting editing efficiency and editing experience of creators in editing multimedia resources.

Therefore, in the multimedia resource editing scenario, creators have a strong demand for the recommendation function for multimedia editing resources.

SUMMARY

To solve the above problems, embodiments of the present disclosure provide a method for recommending editing multimedia resources.

In a first aspect, the present disclosure provides a method for recommending a multimedia editing resource, including:

in response to a recommendation trigger operation in a first resource recommendation scenario, determining a recommendation analysis object corresponding to the first resource recommendation scenario;

determining at least one recommendation tag by analyzing multimedia resources corresponding to the recommendation analysis object; and obtaining a multimedia editing resource that matches the at least one recommendation tag and displaying the multimedia editing resource, wherein the multimedia editing resource is configured to edit initial multimedia resources to obtain target multimedia resources, and the target multimedia resources are presented with an editing effect obtained by applying the multimedia editing resource to the initial multimedia resources.

In an optional implementation, in response to the recommendation trigger operation in the first resource recommendation scenario, determining the recommendation analysis object corresponding to the first resource recommendation scenario includes:

in response to an editing trigger operation for the initial multimedia resources in a multimedia resource editing scenario, determining a target multimedia resource collection corresponding to a current user as a recommendation analysis object corresponding to the multimedia resource editing scenario, wherein the target multimedia resource collection includes at least one of a local album, an editing record of multimedia resources, a collection record of multimedia editing resource, or a usage record of multimedia editing resource.

In an optional implementation, determining the at least one recommendation tag by analyzing multimedia resources corresponding to the recommendation analysis object includes:

analyzing a first multimedia resource in the multimedia resources corresponding to the recommendation analysis object, and determining the recommendation tag corresponding to the first multimedia resource; and determining at least one recommendation tag corresponding to the current user based on the recommendation tag corresponding to the first multimedia resource.

In an optional implementation, each of the at least one recommendation tag has a weight value, the weight value is configured to represent a current user's interest in multimedia editing resource with a corresponding recommendation tag, and obtaining the multimedia editing resource that matches the at least one recommendation tag includes:

obtaining the multimedia editing resource that matches the at least one recommendation tag based on the at least one recommendation tag and weight values corresponding to respective recommendation tags.

In an optional implementation, before obtaining the multimedia editing resource that matches the at least one recommendation tag based on the at least one recommendation tag and the weight values corresponding to respective recommendation tags, the method further includes:

determining a proportion of quantity of multimedia resources with a first recommendation tag in at least one recommendation tag corresponding to the current user, in the multimedia resources corresponding to the recommendation analysis object; and determining a weight value corresponding to the first recommendation tag based on the proportion of quantity corresponding to the first recommendation tag and a predetermined initial weight value of the first recommendation tag.

In an optional implementation, before obtaining the multimedia editing resource that matches the at least one recommendation tag based on the at least one recommendation tag and the weight values corresponding to respective recommendation tags, the method further includes:

classifying the multimedia resources corresponding to the recommendation analysis object to obtain a plurality of resource classification sets, wherein the at least one recommendation tag corresponding to the current user has a correspondence with the plurality of resource classification sets;

determining a predetermined initial weight value of a resource classification set corresponding to a second recommendation tag in the at least one recommendation tag as a first weight value, wherein the first weight value is configured to represent the current user's interest in the resource classification set;

determining a predetermined initial weight value of the second recommendation tag in the resource classification set as a second weight value, wherein the second weight value is configured to represent the current user's interest in multimedia resources with the second recommendation tag in the resource classification set; and determining a weight value of the second recommendation tag based on the first weight value and the second weight value.

In an optional implementation, before obtaining the multimedia editing resource that matches the at least one recommendation tag based on the at least one recommendation tag and the weight values corresponding to respective recommendation tags, the method further includes:

determining, based on a collection weight value of a target multimedia resource collection to which multimedia resources with a third recommendation tag in the at least one recommendation tag belong, a weight value corresponding to the third recommendation tag, wherein the target multimedia resource collection includes at least one of a local album, an editing record of multimedia resources, a collection record of multimedia editing resources, or a usage record of multimedia editing resources, and collection weight values of the editing record of multimedia resources, the collection record of multimedia editing resources, and the usage record of multimedia editing resources are each greater than a collection weight value of the local album.

In a second aspect, the present disclosure provides an apparatus for recommending a multimedia editing resource, including:

a first determining module configured to determine a recommendation analysis object corresponding to a first resource recommendation scenario in response to a recommendation trigger operation in the first resource recommendation scenario;

a second determining module configured to determine at least one recommendation tag by analyzing the multimedia resources corresponding to the recommendation analysis object; and an obtaining module configured to obtain a multimedia editing resource that matches the at least one recommendation tag and display the multimedia editing resource, wherein the multimedia editing resource is configured to edit initial multimedia resources to obtain target multimedia resources, and the target multimedia resources are presented with an editing effect obtained by applying the multimedia editing resource to the initial multimedia resources.

In a third aspect, the present disclosure provides a computer-readable storage medium, the computer-readable storage medium storing instructions that, when executed on a terminal device, cause the terminal device to implement the method described above.

In a fourth aspect, the present disclosure provides a device for recommending a multimedia editing resource, including: a memory, a processor, and a computer program stored on the memory and is capable of being run on the processor, the processor implements the method described above when executing the computer program.

In a fifth aspect, the present disclosure provides a computer program product, the computer program product including a computer program/instructions, the computer program/instructions implement the above method when executed by a processor.

Embodiments of the present disclosure have at least the following advantages over the prior art:

The present disclosure provides a method for recommending a multimedia editing resource. Firstly, in response to a recommendation trigger operation in a first resource recommendation scenario, a recommendation analysis object corresponding to the first resource recommendation scenario is determined. Then, at least one recommendation tag is determined by analyzing multimedia resources corresponding to the recommendation analysis object, and the multimedia editing resource that matches the at least one recommendation tag is obtained and the multimedia editing resource is displayed. The multimedia editing resource is configured to edit initial multimedia resources to obtain target multimedia resources, and the target multimedia resources are presented with an editing effect obtained by applying the multimedia editing resource to the initial multimedia resources. It can be seen that embodiments of the present disclosure can support the function of recommending a multimedia editing resource to creators in the multimedia resource editing scenario.

BRIEF DESCRIPTION OF THE DRAWINGS

The accompanying drawings herein are incorporated in the specification and constitute a part of this specification. The accompanying drawings illustrate embodiments of the present disclosure, and together with the description serve to explain the principles of the present disclosure.

In order to more clearly illustrate the technical solutions in the embodiments of the present disclosure or the prior art, the drawings required for the description of the embodiments or the prior art will be briefly introduced below. Obviously, for those skilled in the art, other drawings can also be obtained based on these drawings without creative labor.

DETAILED DESCRIPTION

In order to better understand the above objects, features, and advantages of the present disclosure, the following will further describe the solutions of the present disclosure. It should be noted that, the embodiments of the present disclosure and the features in the embodiments can be combined with each other without conflict.

Many specific details are set forth in the following description in order to fully understand the present disclosure, but the present disclosure may also be implemented in other ways different from those described herein; obviously, the embodiments in the specification are only part of the embodiments of the present disclosure, not all embodiments.

With continuous development of Internet technology, the amount of information that can be obtained through Internet is increasing. When creators edit multimedia resources, they need to screen out required multimedia editing resources from massive data, which is time-consuming and laborious, affecting the editing efficiency and editing experience of creators in editing multimedia resources.

Therefore, in the multimedia resource editing scenario, creators have a strong demand for the recommendation function for recommending a multimedia editing resource.

To this end, the present disclosure provides a method for recommending a multimedia editing resource. Firstly, in response to a recommendation trigger operation in a first resource recommendation scenario, a recommendation analysis object corresponding to the first resource recommendation scenario is determined. Then, at least one recommendation tag is determined by analyzing multimedia resources corresponding to the recommendation analysis object, and a multimedia editing resource that matches the at least one recommendation tag is obtained and the multimedia editing resource is displayed. The multimedia editing resource is configured to edit initial multimedia resources to obtain target multimedia resources, and the target multimedia resources are presented with an editing effect obtained by applying the multimedia editing resource to the initial multimedia resources. It can be seen that embodiments of the present disclosure can support the function of recommending a multimedia editing resource to creators in the multimedia resource editing scenario.

Figure 1:
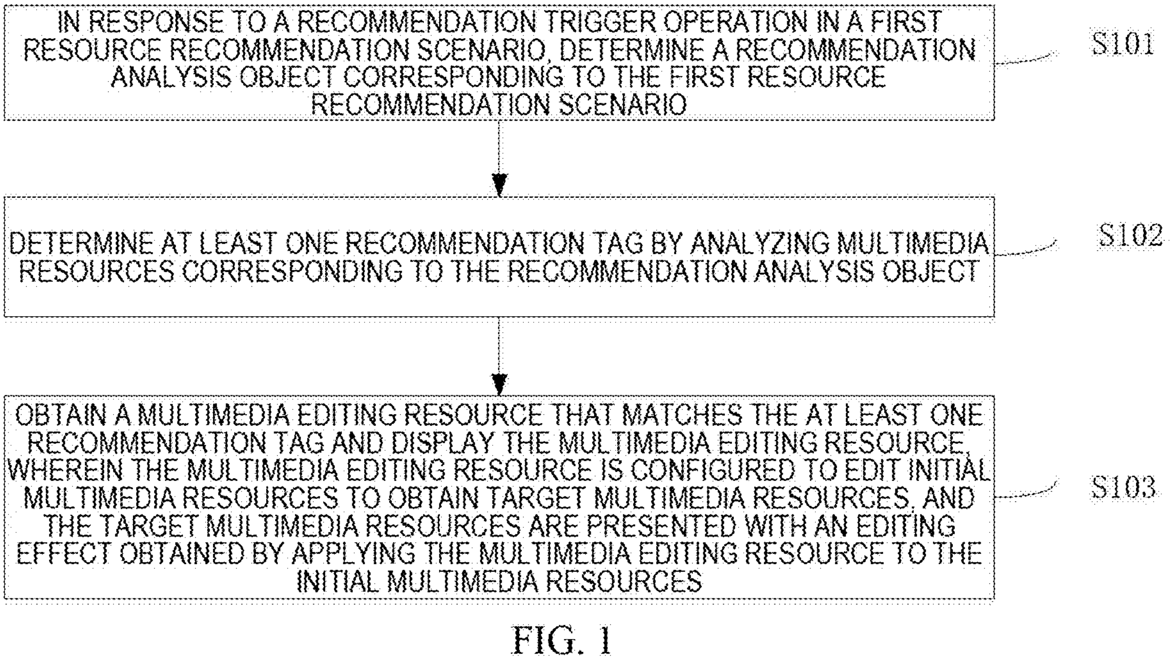
FIG. 1 is a flowchart of a method for recommending a multimedia editing resource provided by an embodiment of the present disclosure.

Based on this, embodiments of the present disclosure provide a method for recommending a multimedia editing resource. With reference to FIG. 1, FIG. 1 is a flowchart of a method for recommending a multimedia editing resource provided by embodiments of the present disclosure, the method includes:

S101: in response to a recommendation trigger operation in a first resource recommendation scenario, determining a recommendation analysis object corresponding to the first resource recommendation scenario.

The method for processing videos provided by the embodiments of the present disclosure may be applied to a client, for example, the client may include a client deployed on a smart phone, a client deployed on a tablet and the like.

In the embodiments of the present disclosure, resource recommendation scenarios may include a multimedia resource editing scenario, such as editing picture material or video material on a picture editing page or a video editing page. The resource recommendation scenarios may also include a multimedia editing resource searching scenario, such as recommending a multimedia editing resource on a searching page. The first resource recommendation scenario is any scenario in the resource recommendation scenarios.

In the embodiments of the present disclosure, when receiving a recommendation trigger operation in any resource recommendation scenario, the resource recommendation scenario is determined as the first resource recommendation scenario, and then a recommendation analysis object corresponding to the first resource recommendation scenario is determined.

In the embodiments of the present disclosure, the recommendation trigger operation in the first resource recommendation scenario may include a trigger operation for a “daily recommendation” entrance in the multimedia editing resource search scenario, and it may also include an editing trigger operation for initial multimedia resources in a multimedia resource editing scenario, etc., the embodiments of the present disclosure do not make limit on this.

In an optional embodiment, in response to an editing trigger operation for the initial multimedia resources in the multimedia resource editing scenario, a target multimedia resource collection corresponding to a current user may be determined as the recommendation analysis object corresponding to the multimedia resource editing scenario, which is convenient for determining at least one recommendation tag through subsequent analysis of the multimedia resources corresponding to the recommendation analysis object. The specific implementation method will be described in the following examples and will not be repeated here. In the embodiments of the present disclosure, the multimedia resources corresponding to the recommendation analysis object may be part or all of the resources in the local album of the current user, part or all of the resources in the local album may include pictures and/or videos; the multimedia resources corresponding to the recommendation analysis object may include at least one picture and/or video being edited by the current user, the multimedia resources corresponding to the recommendation analysis object may further include at least one picture and/or video in the editing record of multimedia resources of a first user, the multimedia resources corresponding to the recommendation analysis object may also include at least one multimedia editing resource in a collection record of the multimedia editing resources of the first user, and the multimedia resources corresponding to the recommendation analysis object may also include at least one multimedia resource in a usage record of the multimedia editing resources of the first user, embodiments of the present disclosure do not limit the multimedia resources corresponding to the recommendation analysis object.

S102: determining at least one recommendation tag by analyzing multimedia resources corresponding to the recommendation analysis object.

In the embodiments of the present disclosure, the at least one recommendation tag may be configured to represent the features of multimedia resources corresponding to the recommendation analysis object.

In embodiments of the present disclosure, the at least one recommendation tag may represent the features of multimedia resources corresponding to the recommendation analysis object from at least one dimension, to reflect the current user’s point of interest. The multimedia resources corresponding to the recommendation analysis object have attribute features that may be used to determine the at least one recommendation tag. The attribute features of the multimedia resources corresponding to the recommendation analysis object include at least one dimension of features such as location, time, subject information, emotional color, etc. For example, pictures or videos contain features such as shooting location, shooting time, shooting subject information, and emotional color reflected by pictures or videos.

Figure 2:
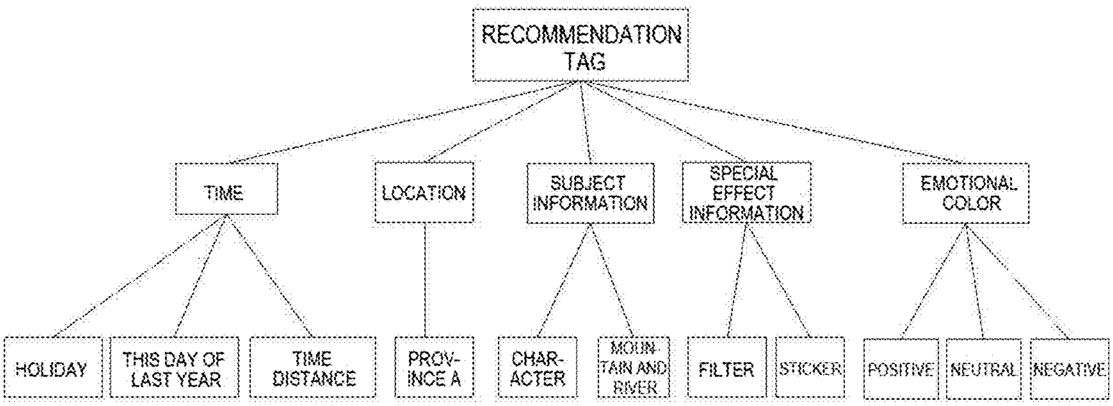
FIG. 2 is an architectural schematic diagram of tag classification provided by an embodiment of the present disclosure.

In the embodiments of the present disclosure, a tag classification method is determined in advance to determine at least one recommended tag. Specifically, the recommendation server may periodically issue tag classification information to the client. As shown in FIG. 2, it is a schematic diagram illustrating tag classification provided by the embodiments of the present disclosure. Recommendation tags may be divided into several types of tags from different dimensions, such as location tags, time tags, subject information tags, special effect information tags, emotional color tags, etc. For each tag classification, it may also be divided in finer grains. Specifically, several types of tags, such as location tags, time tags, subject information tags, special effect information tags, emotional color information tags, etc., may be respectively classified more finely. For example, time tags may include tags determined based on shooting time, such as a holiday tag, a this day of last year tag, a time distance tag, etc. Location tags may include a province A tag, a province B tags, certain scenic spot tag, etc. Subject information tags may include a character tag, a mountain and river tag, a sky tag, etc. Special effect information tags may include editing effect tags such as a filter tag and a sticker tag. Emotional color tags may include a positive tag, a neutral tag and a negative tag, etc. In practical applications, the classification of recommendation tags and the division for each tag classification in finer grains are not limited to the content shown in FIG. 2.

In an optional implementation, the multimedia resources corresponding to the recommendation analysis object are analyzed by a machine vision learning library (such as OpenCV) to determine the recommendation tag corresponding to the current user. Specifically, the first multimedia resource in the multimedia resources corresponding to the recommendation analysis object is identified according to different dimensions to determine the recommendation tag corresponding to the first multimedia resource, and recommendation tags corresponding to a plurality of the first multimedia resources are clustered to determine the recommendation tag corresponding to the current user. Among them, the recommendation tags of larger quantities may be determined as the recommendation tags corresponding to the current user.

Assuming that the multimedia resources corresponding to the recommendation analysis object are multimedia resources in a local album, identification is performed on a certain picture (i.e. the first multimedia resource) in the local album. Based on the identification result, it may be determined that this picture includes tags such as "New Year tag", "mountain and rives tag", and "positive tag". In this way, identification is performed on the selected part or all of the pictures in the local album, and the number of recommendation tags corresponding to the selected part or all of the pictures in the local album is determined. The recommendation tags of larger quantities are determined as the recommendation tags corresponding to the current user. Assuming that the quantities of recommendation tags "New Year tag", "portrait tag", and "positive tag" corresponding to the selected part or all of the pictures in the local album are large, the "New Year tag", "portrait tag" and "positive tag" are determined as the recommendation tags corresponding to the current user.

S103: obtaining multimedia editing resource that matches the at least one recommendation tag and displaying the multimedia editing resource.

The multimedia editing resource is configured to edit initial multimedia resources to obtain target multimedia resources, and the target multimedia resources are presented with editing effect obtained by applying the multimedia editing resource to the initial multimedia resources. In the embodiments of the present disclosure, the multimedia editing resource may include editing templates and/or special effects corresponding to videos or pictures, and the multimedia editing resource that matches the recommendation tags may include editing templates and/or special effects with theme names and or display content matching the recommendation tags. For example, assuming the determined recommendation tag is a "mountain and river tag", by searching theme names or display content corresponding to templates or special effects, the templates or special effects with theme names or display content the same as or similar to the "mountain and river" may be used as the obtained a multimedia editing resource, and then displayed.

In embodiments of the present disclosure, firstly, in response to a recommendation trigger operation in the first resource recommendation scenario, a recommendation analysis object corresponding to the first resource recommendation scenario is determined; then, at least one recommendation tag is determined by analyzing the multimedia resources corresponding to the recommendation analysis object; and then multimedia editing resource that matches the at least one recommendation tag is obtained and the multimedia editing resource is displayed; where the multimedia editing resource is configured to edit initial multimedia resources to obtain target multimedia resources, and the target multimedia resources are presented with editing effect obtained by applying the multimedia editing resource to the initial multimedia resources. It can be seen that embodiments of the present disclosure can support the function of recommending a multimedia editing resource for creators in the multimedia resource editing scenario.

In an alternative embodiment, assuming that by analyzing the multimedia resources corresponding to the recommendation analysis object, the determined recommendation tags include "New Year tag", "portrait tag", and "positive tag", then the "new year tag", "portrait tag" and "positive tag" are sent to the recommendation server, and the recommendation server may recommend corresponding templates and special effects to the current user based on the "New Year tag", "portrait tag" and "positive tag". Specifically, after sending the "new year tag", "portrait tag" and "positive tag" to the recommendation server, the recommendation server may recommend corresponding multimedia editing resource such as an editing template and/or special effect to the current user based on part or all of the tags in the "New Year tag", "portrait tag" and "positive tag".

In the method for recommending a multimedia editing resource provided by the present disclosure, firstly, in response to a recommendation trigger operation in the first resource recommendation scenario, a recommendation analysis object corresponding to the first resource recommendation scenario is determined; then, at least one recommendation tag is determined by analyzing the multimedia resources corresponding to the recommendation analysis object; and then multimedia editing resource that matches the at least one recommendation tag is obtained and the multimedia editing resource is displayed; where the multimedia editing resource is configured to edit initial multimedia resources to obtain target multimedia resources, and the target multimedia resources are presented with editing effect obtained by applying the multimedia editing resource to the initial multimedia resources. It can be seen that embodiments of the present disclosure can support the function of recommending a multimedia editing resource for creators in the multimedia resource editing scenario.

Figure 3:
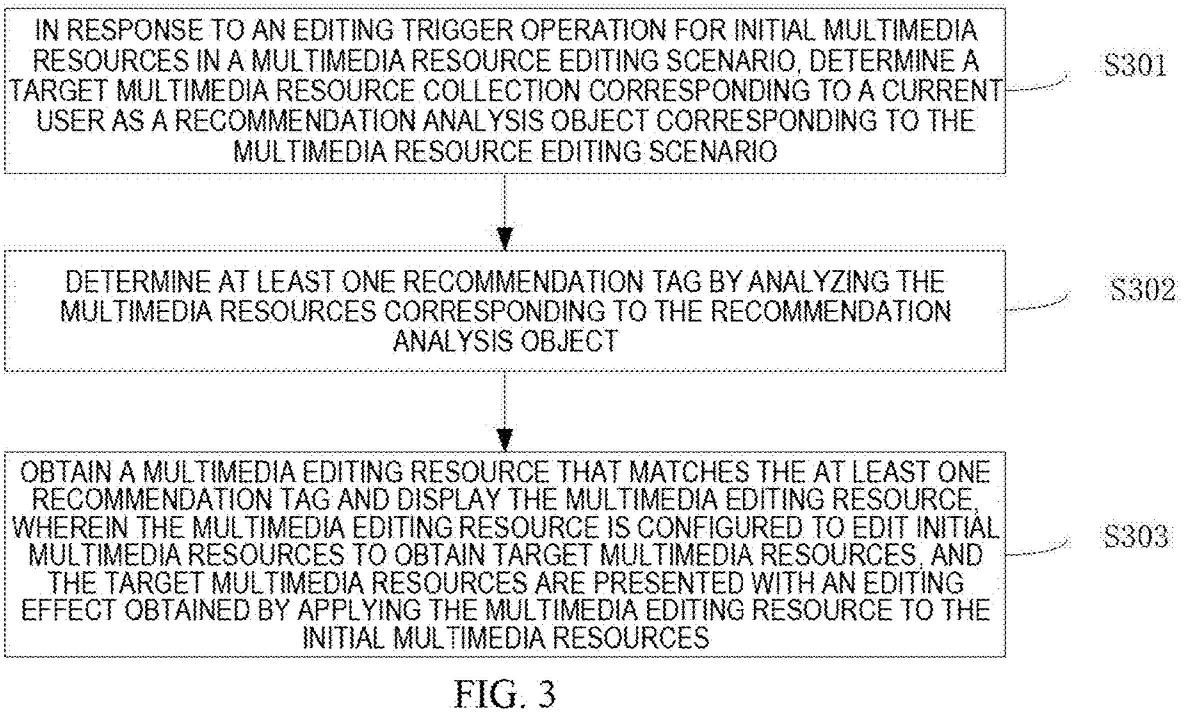
FIG. 3 is a flowchart of another method for recommending a multimedia editing resource provided by an embodiment of the present disclosure.

Based on the above embodiment, the present disclosure also provides a method for recommending a multimedia editing resource in a multimedia resource editing scenario. Referring to FIG. 3, it is a flowchart of another method for recommending a multimedia editing resource provided by an embodiment of the present disclosure, the method includes:

S301: in response to an editing trigger operation for the initial multimedia resources in the multimedia resource editing scenario, determining a target multimedia resource collection corresponding to a current user as the recommendation analysis object corresponding to the multimedia resource editing scenario.

The target multimedia resource collection includes at least one of a local album, an editing record of multimedia resources, a collection record of multimedia editing resources, or a usage record of multimedia editing resources.

In embodiments of the present disclosure, the initial multimedia resource may include a picture being edited by the current user, the initial multimedia resource may also include an picture being edited by the current user, etc. The embodiments of the present disclosure do not limit the source of the initial multimedia resources.

Specifically, when receiving the current user's edit trigger operation for the initial multimedia resources, the target multimedia resource collection corresponding to the current user is determined as the analysis object corresponding to the multimedia resource editing scenario. For example, when receiving a click operation on the local album of the current user, the local album of the current user is determined as the recommendation analysis object corresponding to the multimedia resource editing scenario, which facilitates subsequent analysis of the multimedia resources corresponding to the recommendation analysis object.

In the embodiments of the present disclosure, the target multimedia resource collection refers to a collection that includes a set of at least one of a local album, an editing record of multimedia resources, a collection record of multimedia editing resources, or a usage record of multimedia editing resources. The editing record of multimedia resources refers to the current user's editing record for pictures or videos, which may specifically include at least one editing record, each editing record including an identification of the picture or video and its corresponding editing method, editing time, etc. The editing record of multimedia resources may indicate that the user is more interested in a certain picture or video. It is to be understood that the current user's interest in the pictures or videos included in the editing record of the multimedia resources is higher than that in the local album of the current user.

The collection record of multimedia editing resources includes the multimedia editing resources collected by the current user, such as editing templates and special effects. The user will trigger a behavior of collecting a certain multimedia editing resource when he/she is interested in the multimedia editing resource, therefore the collection record of multimedia editing resources may indicate that the user is more interested in the editing templates and special effects in the collection record. Therefore, the current user's interest in the multimedia editing resource in the collection record of multimedia editing resources is also higher than that in the current user's local album.

The usage record of multimedia editing resources refers to a record of editing templates, special effects, etc. that has already been used by the user. Since there is a usage records of a user for a certain multimedia editing resource, it may indicate that the user has a higher interest in the multimedia editing resource.

In practical applications, the scenarios for determining the recommendation analysis object corresponding to the first resource recommendation scenario are diverse, and the recommendation analysis object corresponding to the first resource recommendation scenario may be flexibly determined according to different scenarios. Specifically, multimedia resources corresponding to at least one of the local album of the current user, the editing record of multimedia resources, the collection record of multimedia editing resources or the usage record of multimedia editing resources may be determined as the recommendation analysis object corresponding to the first resource recommendation scenario.

In an optional embodiment, assuming that the target multimedia resource collection is the local album of the current user, part or all of the pictures and/or videos in the local album of the current user are determined as the recommendation analysis object corresponding to the multimedia resource editing scenario.

In another alternative embodiment, since the editing record of the multimedia resources, the collection record of the multimedia editing resources, and the usage record of the multimedia editing resource may reflect the current user's preferences, the multimedia resources corresponding to at least one of the editing record of the multimedia resources, the collection record of the multimedia editing resources, or the usage record of the multimedia editing resources may be determined as the recommendation analysis object corresponding to the multimedia resource editing scenario.

Specifically, part or all of the pictures and/or videos in the editing record of multimedia resources may be determined as the recommendation analysis objects corresponding to the multimedia resource editing scenario. Anyone of the collection record of multimedia editing resources and the usage record of multimedia editing resources may also be determined as the target multimedia resource collection, and part or all of corresponding multimedia editing resources in the target multimedia resource collection may be determined as the recommendation analysis objects corresponding to the multimedia resource editing scenario. Part or all of the pictures and/or videos corresponding to the editing record of multimedia resources, as well as part or all of the multimedia editing resources corresponding to the collection record of multimedia editing resources and/or usage record of multimedia editing resources may also be determined as the recommendation analysis objects corresponding to the multimedia resource editing scenario.

In an optional embodiment, the recommendation analysis object corresponding to the multimedia resource editing scenario may be determined from multiple dimensions. Specifically, the local album of the current user may be combined with at least one of the editing record of the multimedia resources, the collection record of the multimedia editing resources or the usage record of the multimedia editing resources, so that the recommendation analysis object corresponding to the multimedia resource editing scenario is determined from part or all of the pictures and/or videos in the local album, part or all of the pictures and/or videos corresponding to the editing record of the multimedia resource, and part or all of the multimedia editing resources corresponding to at least one of the collection record of the multimedia editing resources or the usage record of the multimedia editing resources.

S302: determining at least one recommendation tag by analyzing the multimedia resources corresponding to the recommendation analysis object.

The recommendation tag is configured to represent features of the multimedia resources.

In an optional implementation, the multimedia resources corresponding to the recommendation analysis object are identified by a machine vision learning library (such as OpenCV), to determine at least one recommendation tag. Specifically, the multimedia resources corresponding to the recommendation analysis object are identified according to different dimensions, to determine the recommendation tags included in the multimedia resources corresponding to the recommendation analysis object, and a plurality of recommendation tags are clustered to determine the recommendation tag. Among them, a recommendation tag of a larger number in the recommendation tags may be determined as the recommendation tag.

Assuming that identification is performed on a certain picture in the local album, it may be determined based on the identification result that the picture includes tags such as "New Year's tag", "mountains and rivers", "positive tags", etc. In this way, identification is performed on the selected part or all of the pictures in the local album, and the number of recommendation tags corresponding to the selected part or all of the pictures in the local album is determined. The recommendation tags of a larger number are determined as the recommendation tags in the multimedia resources corresponding to the recommendation analysis object. Assuming that there are a lot of recommendation tags "New Year tag", a "portrait tag", and a "positive tag" in the selected part or all of the pictures in the local album, then the "New Year tag", "portrait tag", and "positive tag" are determined as the recommendation tags.

In one application scenario, the target multimedia resource collection may include at least one of an editing record of the multimedia resource, a collection record of the multimedia editing resource, or a usage record of the multimedia editing resource.

In an optional implementation, if the collection record of the multimedia editing resource is the target multimedia resource collection, the recommendation analysis object corresponding to the multimedia resource scenario may be determined based on the multimedia editing resources collected in the collection record of the multimedia editing resources. In practical applications, the recommendation tags corresponding to respective multimedia editing resources may be determined, and in the recommendation tags respectively corresponding to the editing templates and special effects collected in the collection record of the multimedia editing resources, the recommendation tag of the largest quantity may be determined as the recommendation tag.

Specifically, by performing identification on the editing templates and special effects in the collection record of multimedia editing resources, the recommendation tags respectively corresponding to the editing templates and special effects in the collection record of multimedia editing resources are determined. Assuming that the identification results include 3 filter tags, 1 sticker tag, and 1 mountain and river tag, it may be determined that the recommendation tags include "filter tag".

In practical applications, for the method for determining recommendation tags based on the editing record of multimedia resources and the usage record of multimedia editing resources, the method for determining recommendation tags based on editing templates and special effects in the collection record of multimedia editing resources may be referred to, which will not be repeated here.

Since the editing record of multimedia resources, the collection record of multimedia editing resources, and the usage record of multimedia editing resources may indicate the user's preference for editing templates and special effects, the recommendation tag may be determined based on at least one of the editing record of multimedia resources, the collection record of multimedia editing resources or the usage record of multimedia editing resources. This can accurately determine the recommendation tag that the current user is interested in, and recommend multimedia editing resources of interest to the user based on the recommendation tag.

In order to recommend the multimedia editing resource of interest to users more accurately, in an optional implementation, the local album of the current user may be combined with at least one of the editing record of the multimedia resources, the collection record of the multimedia editing resources, or the usage record of the multimedia editing resources. The recommendation tag may be inferred based on the editing record of the multimedia resources, the collection record of the multimedia editing resources and the usage record of the multimedia editing resources, and in combination with the recommendation tag determined based on the local album of the current user, the multimedia editing resource of interest may be recommended to the user. Specifically, for the method of determining the recommendation tag, the previous introduction may be referred to, which will not be repeated here.

S303: obtaining multimedia editing resource that matches the at least one recommendation tag and displaying the multimedia editing resource.

The multimedia editing resource is configured to edit initial multimedia resources to obtain target multimedia resources, and the target multimedia resources are presented with editing effect obtained by applying the multimedia editing resource to the initial multimedia resource.

In an optional embodiment, in response to an editing trigger operation for the initial multimedia resources in the multimedia resource editing scenario, a target multimedia resource collection corresponding to a current user is determined as the recommendation analysis object corresponding to the multimedia resource editing scenario, at least one recommendation tag is determined by analyzing the multimedia resources corresponding to the recommendation analysis object, and recommendation tag of a large quantity in the at least one recommendation tags is determined as the recommendation tag corresponding to the recommendation analysis object. After determining the recommendation tag, the recommendation tag is sent to the recommendation server, and the recommendation server recommends the multimedia editing resource to the user based on the recommendation tag.

Assuming that there are a large number of "filter tags", "sticker tags" and "character tags", then the "filter tags", "sticker tags" and "character tags" may be determined as the recommendation tags, and the "filter tags", "sticker tags", and "character tags" may be sent to the recommendation server. The recommendation server recommends multimedia editing resource to the users based on the "filter tags", "sticker tags", and "character tags".

In the embodiments of the present disclosure, at least one recommendation tag is determined by analyzing the multimedia resources corresponding to the recommendation analysis object, to recommend multimedia editing resource that matches the recommendation tag to the current user, thus achieving a more lightweight recommendation method. In addition, the recommendation of multimedia editing resource is realized based on analysis of multimedia resources corresponding to the recommendation analysis object, which improves the accuracy of multimedia editing resource recommendation.

Based on the above method embodiments, the present disclosure also provides another method for recommending a multimedia editing resource.

In embodiments of the present disclosure, after determining the at least one recommendation tag by analyzing the multimedia resources corresponding to the recommendation analysis object, weight values may be correspondingly set for at least one recommendation tag respectively, and then the multimedia editing resource that matches the at least one recommendation tag is obtained based on the at least one recommendation tag and weight values corresponding to respective recommendation tags.

In an alternative embodiment, before sending the at least one recommendation tag to the recommendation server, first, the weight value corresponding to the recommendation tag is determined, wherein the weight value is configured to represent the current user's interest in multimedia editing resource with a corresponding recommendation tag; then, the at least one recommendation tag and the weight values corresponding to respective recommendation tags are sent to the recommendation server, wherein the recommendation server is configured to recommend multimedia editing resource to the current user based on the at least one recommendation tag and the weight values respectively corresponding to respective recommendation tags.

In an optional implementation, each recommendation tag has a corresponding weight value, and the recommendation server may determine the corresponding weight value for each recommendation tag in advance, and the weight value may represent the current user's interest in multimedia editing resource with a corresponding recommendation tag. Relatively speaking, assuming that the weight value of the recommendation tag is higher, it indicates that the current user's interest in the pictures or videos corresponding to the recommendation tag may be stronger, or the current user's interest in the multimedia editing resource corresponding to the recommendation tag may be stronger. At least one recommendation tag and the weight values corresponding to respective recommendation tags are determined, and the at least one recommendation tag and the weight values corresponding to respective recommendation tags are sent to the recommendation server. The recommendation server may recommend corresponding multimedia editing resource to the current user based on at least one recommendation tag and the weight values corresponding to respective recommendation tags.

It can be seen that embodiments of the present disclosure can provide users with personalized recommendation of multimedia editing resource that matches the at least one recommendation tag based on at least one recommendation tag and the weight values corresponding to respective recommendation tags, which achieves a more lightweight recommendation. Further, the embodiments of the present disclosure determine at least one recommendation tag by analyzing the multimedia resources corresponding to the recommendation analysis object, determine the weights corresponding to respective recommendation tags, and recommends multimedia editing resource based on the at least one recommendation tag and the weights corresponding to respective recommendation tags, thus improving the accuracy of multimedia editing resource recommendation.

Assuming that at least one recommendation tag only includes a "New Year tag", a "portrait tag", and a "positive tag", where the weight value corresponding to "New Year tag" is 50%, the weight value corresponding to "positive tag" is 30%, and the weight value corresponding to "positive tag" is 20%. The weight values corresponding to "New Year tag", "portrait tag", "positive tag" and these recommendation tags may be sent to the recommendation server, and the recommendation server may recommend corresponding templates and special effects to the current user based the "New Year tag", "portrait tag", "positive tag" and the weight values corresponding to these recommendation tags. Specifically, the recommendation server may prioritize recommending the templates and special effects corresponding to the "New Year tag"-"Portrait tag"- and "positive tag" to the current user. The recommendation server may also recommend the templates and special effects corresponding to a combination of two of these three tags to the current user, and recommend the templates and special effects respectively corresponding to these three tags to the current user.

In an alternative implementation, first, the first multimedia resource in the multimedia resources corresponding to the recommendation analysis object is analyzed to determine the recommendation tag corresponding to the first multimedia resource; and at least one recommendation tag corresponding to the current user is determined based on the recommendation tag corresponding to the first multimedia resource; then, in the multimedia resources corresponding to the recommendation analysis object, a proportion of quantity of multimedia resources with a first recommendation tag in at least one recommendation tag corresponding to the current user is determined; and the weight value corresponding to the first recommendation tag is determined based on the proportion of the quantity corresponding to the first recommendation tag and the predetermined initial weight value of the first recommendation tag.

Assuming that part or all of the pictures and/or videos in the local album are analyzed, the recommendation tag corresponding to each of the part or all of the pictures and/or videos in the local album may be determined, and at least one recommendation tag corresponding to the current user is determined based on the recommendation tag corresponding to each of the part or all of the pictures and/or videos in the local album, wherein the recommendation tag corresponding to the current user includes a plurality of recommendation tags, and the first recommendation tag is anyone in the plurality of recommendation tags.

In practical applications, a proportion of quantity of the multimedia resources of the first recommendation tag in the multimedia resources corresponding to the recommendation analysis object may be determined, and the weight value corresponding to the first recommendation tag may be determined based on the proportion of quantity corresponding to the first recommendation tag and the predetermined initial weight value of the first recommendation tag. The recommendation server may provide personalized recommendation for multimedia editing resource to the current user based on the recommendation tag corresponding to the current user and the weight value corresponding to the first recommendation tag.

Assuming that in the scenario where multimedia editing resource recommended to the current user is determined based on pictures in the local album, 10 pictures are selected from the local album, in which 8 pictures have a New Year tag, 1 picture has a portrait tag, and 1 picture has a positive tag. It may be determined that the recommendation tags corresponding to the current user include a "New Year tag", a "portrait tag", and a "positive tag". The first recommendation tag may be any one of the "New Year tag", "portrait tag", and "positive tag". Assuming that the first recommendation tag is the "New Year tag", it may be determined that the proportion of quantity of the pictures with "New Year tag" in the 10 pictures is 80%. Assuming that the predetermined initial weight of the "New Year tag" is 50%, the weight value corresponding to the "New Year tag" may be determined based on the proportion of quantity of "New Year tag" and the predetermined initial weight value of the "New Year tag". For the method for calculating the weight value corresponding to the "portrait tag" and "positive tag", the method for calculating the weight value corresponding to the "New Year tag" may be referred to, which will not be repeated here.

Finally, the "portrait tag", "positive tag" and "New Year tag" and weight values corresponding to these tags may be sent to the recommendation server; the recommendation server recommends multimedia editing resource to users based on the "portrait tag", "positive tag" and "New Year tag" and their corresponding weight values.

In another optional embodiment, at least one recommendation tag corresponding to the current user is determined based on at least one of the editing record of the multimedia resources, the collection record of the multimedia editing resources, or the usage record of the multimedia editing resources. Assuming that by identifying the editing templates and special effects in the collection record of the multimedia editing resources, the recommendation tags respectively corresponding to the editing templates and special effects in the collection record of the multimedia editing resources are determined. Assuming that the identification result includes three filter tags, one sticker tag, and one mountain and river tag, it may be determined that the recommendation tags corresponding to the current user include "filter tag", "sticker tag", and "mountain and river tag". The first recommendation tag may be any one of "filter tag", "sticker tag", or "mountain and river tag". Assuming the first recommendation tag is "filter tag", it may be determined that the proportion of the quantity of the "filter tag" is 50%. Assuming the initial weight of the predetermined "filter tag" is 60%, the weight value corresponding to the "filter tag" may be determined based on the proportion of the quantity of "filter tags" and the predetermined initial weight value of the "filter tag". For the method of calculating the weight value corresponding to the "sticker tag" and "mountain and river tag", the method of calculating the weight value corresponding to the "filter tag" tag may be referred to, which will not be repeated here. Finally, the "filter tag", "sticker tag" and "mountain and river tag" and the weight values corresponding to these tags may be sent to the recommendation server. The recommendation server recommends multimedia editing resource to users based on the "filter tag", "sticker tag" and "mountain and river tag" and the weight values corresponding to these tags.

In practical applications, for the method for determining the first recommendation tag and its corresponding weight based on the editing record of multimedia resources and the usage record of multimedia editing resources, the method for determining the first recommendation tag and its corresponding weight based on the editing templates and special effects in the collection record of multimedia editing resources may be referred to, which will not be repeated here.

Since the editing record of multimedia resources, the collection record of multimedia editing resources, and the usage record of multimedia editing resources may indicate the user's preference for editing templates and special effects, the first recommendation tag may be determined based on a collection corresponding to the editing record of multimedia resources, the collection record of multimedia editing resources and the usage record of multimedia editing resources, thus the recommendation tag corresponding to the current user may be accurately determined. Based on the recommendation tag corresponding to the current user and the weight corresponding to the first recommendation tag, the multimedia editing resource of interest can be accurately recommended to the current user.

In order to recommend multimedia editing resource of interest to users more accurately, in an optional implementation, the local album of the current user may be combined with at least one of the editing record of the multimedia resources, the collection record of the multimedia editing resources, or the usage record of the multimedia editing resources. The recommendation tags that the user is interested in and the weight values corresponding to these recommendation tags may be inferred based on the editing record of the multimedia resources, the collection record of the multimedia editing resources, and the usage record of the multimedia editing resources, and in combination with the recommendation tags corresponding to the current user determined based on the local album of the current user and the corresponding weight values of these recommendation tags, the multimedia editing resource of interest may be recommended to the user. Specifically, for the method of calculating the recommendation tags in the editing record of the multimedia resources, the collection record of the multimedia editing resources and the usage record of the multimedia editing resources and the weight values corresponding to these recommendation tags and the method of calculating the recommendation tags corresponding to the current user determined by the local album of the current user and the corresponding weight values of these recommendation tags, the previous introduction may be referred to, which will not be repeated here.

In an optional embodiment, the method further includes before obtaining the multimedia editing resource that matches the at least one recommendation tag based on the at least one recommendation tag and weight values corresponding to respective recommendation tags, classifying the multimedia resources corresponding to the recommendation analysis object to obtain a plurality of resource classification sets, wherein the at least one recommendation tag corresponding to the current user has a correspondence with the plurality of resource classification sets.

Assuming that part or all of the pictures in the local album are classified, and a plurality of picture classification sets are obtained, such as "New Year set", "portrait set", "mountain and river set", etc., and a plurality of picture classification sets have a correspondence with at least one recommendation tag corresponding to the current user. For example, there is a correspondence between "New Year set" and the recommendation tag with the tag name "New Year tag", there is a correspondence between "portrait set" and the recommendation tag with the tag name "portrait tag", and there is a correspondence between "mountain and river set" and the recommendation tag with the tag name "scenery Tag".

In an optional embodiment, after classifying the multimedia resources corresponding to the recommendation analysis object to obtain a plurality of resource classification sets, first, a predetermined initial weight value of a resource classification set corresponding to a second recommendation tag in the at least one recommendation tag is determined as a first weight value, wherein the first weight value is configured to represent the current user's interest in the resource classification set; and a predetermined initial weight value of the second recommendation tag in the resource classification set is determined as a second weight value, wherein the second weight value is configured to represent the current user's interest in multimedia resources with the second recommendation tag in the resource classification set; and a weight value of the second recommendation tag is determined based on the first weight value and the second weight value.

In embodiments of the present disclosure, the recommendation tags corresponding to the current user include a plurality of recommendation tags, the second recommendation tag is anyone in the plurality of recommendation tags.

Assuming that the resource classification sets corresponding to the recommendation tags includes a location set, a time set, a subject information set, a special effect information set, etc., the predetermined initial weight value of a resource classification set corresponding to each recommendation tag is determined in advance as the first weight value. Taking the time sets as an example for analysis, the time sets include sets determined based on shooting time, such as holiday sets, this day of last year sets, time distance sets, etc. The resource classification set corresponding to the second recommendation tag may be anyone of the holiday set, this day of last year sets, and time distance sets. A predetermined initial weight value of the second recommendation tag in the resource classification set is further determined as the second weight value. By determining weight values at two levels, the weight of each recommendation tag may be accurately determined. In embodiments of the present disclosure, the method of calculating the weight value of the second recommendation tag based on the predetermined initial weight value of the resource classification set corresponding to the second recommendation tag and the predetermined initial weight value of the second recommendation tag in the resource classification set is not limited.

Assuming that the second recommendation tag is the this day of last year tag, before determining the weight value corresponding to the this day of last year tag, the weight value corresponding to the this day of last year tag may be determined based on the first and second weight values corresponding to the this day of last year tag. The first weight value is an initial predetermined weight value of the resource classification set corresponding to the time tag, and the second weight value is an initial predetermined weight value of the this day of last year tag in the resource classification set. By determining weights at two levels, the weight of each second recommendation tag can be accurately determined.

In an optional implementation, the target multimedia resource collection includes at least one of a local album, an editing record of the multimedia resources, a collection record of the multimedia editing resources, or a usage record of the multimedia editing resources; the collection weight values of the editing record of the multimedia resources, the collection record of the multimedia editing resources and the usage record of the multimedia editing resource are all greater than the collection weight value of the local album; a weight value corresponding to a third recommendation tag is determined based on a collection weight value of the target multimedia resource collection to which the multimedia resource with a third recommendation tag in the at least one recommendation tag belongs. The third recommendation tag is anyone of the at least one recommendation tag.

In practical applications, the weight value of the third recommendation tag is also affected by the collection it belongs to, and the weights are different in different collections. Since the editing record of multimedia resources, the collection record of multimedia editing resources and the usage record of multimedia editing resources can reflect the recommendation tag that users are more interested in, it is possible to set the collection weight values of the editing record of multimedia resources, the collection record of multimedia editing resources, and the usage record of multimedia editing resources to be greater than the collection weight value of the local album. Then, based on the collection weight value of the target multimedia resource collection to which the multimedia resources of the third recommendation tag belong, the weight value corresponding to the third recommendation tag is determined.

In the embodiments of the present disclosure, the at least one recommendation tag corresponding to the current user and the weight values respectively corresponding to respective recommendation tags may be determined based on at least one of the local album, the editing record of multimedia resources, the collection record of multimedia editing resources and the usage record of multimedia editing resources, or multimedia editing resource that matches the at least one recommendation tag are obtained based on at least one recommendation tag and weight values corresponding to respective recommendation tags and then recommended to the user, so that multimedia editing resource of interest can be accurately recommended to the user.

Figure 4:
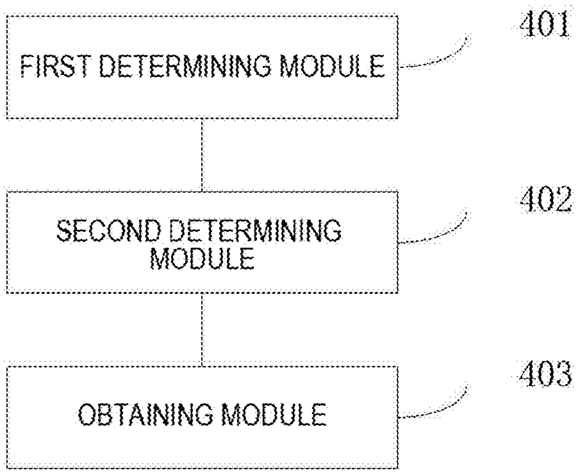
FIG. 4 is a structural schematic diagram of an apparatus for recommending a multimedia editing resource provided by an embodiment of the present disclosure.

Based on the above embodiment, the present disclosure also provides an apparatus for recommending a multimedia editing resource. With reference to FIG. 4, FIG. 4 is a structural schematic diagram of an apparatus for recommending a multimedia editing resource provided by the embodiments of the present disclosure, the apparatus including:

a first determining module 401 configured to determine a recommendation analysis object corresponding to the first resource recommendation scenario, in response to a recommendation trigger operation in a first resource recommendation scenario; and a second determining module 402 configured to determine at least one recommendation tag by analyzing multimedia resources corresponding to the recommendation analysis object; and an obtaining module 403 configured to obtain a multimedia editing resource that matches the at least one recommendation tag and display the multimedia editing resource, wherein the multimedia editing resource is configured to edit initial multimedia resources to obtain target multimedia resources, and the target multimedia resources are presented with editing effect obtained by applying the multimedia editing resource to the initial multimedia resources.

In an optional implementation, the first determination module includes:

a first determining sub-module configured to, in response to an editing trigger operation for the initial multimedia resources in a multimedia resource editing scenario, determine a target multimedia resource collection corresponding to a current user as a recommendation analysis object corresponding to the multimedia resource editing scenario, wherein the target multimedia resource collection includes at least one of a local album, an editing record of multimedia resources, a collection record of multimedia editing resources, or a usage record of multimedia editing resources.

In an optional implementation, the second determining module includes:

a second determining sub-module configured to analyze a first multimedia resource in the multimedia resources corresponding to the recommendation analysis object, and determine the recommendation tag corresponding to the first multimedia resource; and a third determination sub-module configured to determine at least one recommendation tag corresponding to the current user based on the recommendation tag corresponding to the first multimedia resource.

In an optional embodiment, each of the at least one recommendation tag has a weight value, the weight value is configured to represent a current user's interest in multimedia editing resource with a corresponding recommendation tag, and the obtaining module includes:

an obtaining sub-module configured to obtain the multimedia editing resource that matches the at least one recommendation tag based on the at least one recommendation tag and weight values corresponding to respective recommendation tags.

In an optional embodiment, the obtaining module further includes:

a fourth determining sub-module configured to determine a proportion of quantity of multimedia resources with a first recommendation tag in at least one recommendation tag corresponding to the current user, in the multimedia resources corresponding to the recommendation analysis object; and a fifth determining sub-module is used to determine a weight value corresponding to the first recommendation tag based on the proportion of quantity corresponding to the first recommendation tag and a predetermined initial weight value of the first recommendation tag.

In an optional embodiment, the obtaining module further includes:

a classification sub-module configured to classify the multimedia resources corresponding to the recommendation analysis object to obtain a plurality of resource classification sets, wherein the at least one recommendation tag corresponding to the current user has a correspondence with the plurality of resource classification sets;

a sixth determining sub-module configured to determine a predetermined initial weight value of a resource classification set corresponding to a second recommendation tag in the at least one recommendation tag as a first weight value, wherein the first weight value is configured to represent the current user's interest in the resource classification set;

a seventh determining sub-module configured to determine a predetermined initial weight value the second recommendation tag in the resource classification set as a second weight value, wherein the second weight value is configured to represent the current user's interest in multimedia resources with the second recommendation tag in the resource classification set; and an eighth determining sub-module configured to determine a weight value of the second recommendation tag based on the first weight value and the second weight value.

In an alternative embodiment, the obtaining module further includes:

a ninth determining sub-module configured to determine, based on a collection weight value of a target multimedia resource collection to which a multimedia resource with a third recommendation tag in the at least one recommendation tag belongs, a weight value corresponding to the third recommendation tag, wherein the target multimedia resource collection includes at least one of a local album, an editing record of multimedia resources, a collection record of multimedia editing resources, or a usage record of multimedia editing resources, and collection weight values of the editing record of multimedia resources, the collection record of multimedia editing resources, and the usage record of multimedia editing resources are all greater than a collection weight value of the local album.

In the apparatus for recommending a multimedia editing resource provided by the embodiments of the present disclosure, firstly, in response to a recommendation trigger operation in a first resource recommendation scenario, a recommendation analysis object corresponding to the first resource recommendation scenario is determined. Then, at least one recommendation tag is determined by analyzing multimedia resources corresponding to the recommendation analysis object, and the multimedia editing resource that matches the at least one recommendation tag is obtained and the multimedia editing resource is displayed. The multimedia editing resource is configured to edit initial multimedia resources to obtain target multimedia resources, and the target multimedia resources are presented with editing effect obtained by applying the multimedia editing resource to the initial multimedia resources. It can be seen that embodiments of the present disclosure can support the function of recommending a multimedia editing resource to creators in the multimedia resource editing scenario.

In addition to the above-described methods and apparatuses, embodiments of the present disclosure also provide a computer-readable storage medium, the computer-readable storage medium stores instructions, when the instructions run on a terminal device, the terminal device implements the method for recommending a multimedia editing resource as described in the embodiments of the present disclosure.

Embodiments of the present disclosure also provides a computer program product, the computer program product including a computer program/instructions, when executed by a processor, the computer program/instructions implement the method for recommending a multimedia editing resource as described in the embodiments of the present disclosure.

Figure 5:
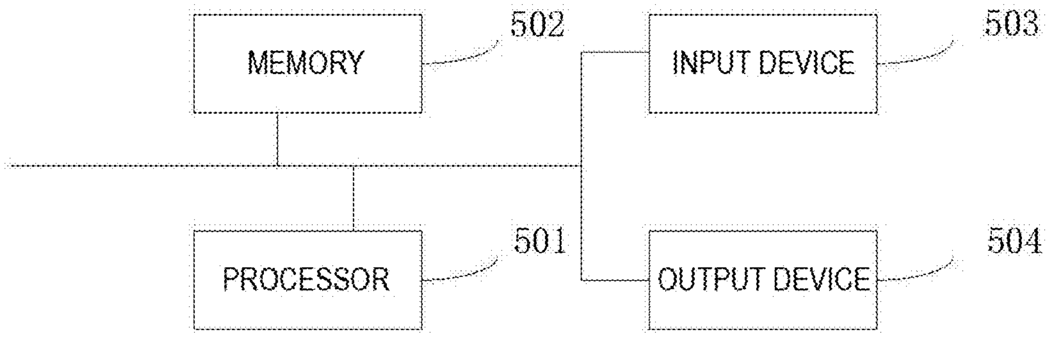
FIG. 5 is a structural schematic diagram of a device for recommending a multimedia editing resource provided by an embodiment of the present disclosure.

Further, the embodiments of the present disclosure also provide a device for recommending a multimedia editing resource. As shown in FIG. 5, the device may include:

a processor 501, a memory 502, an input device 503, and an output device 504. The number of processors 501 in the device for recommending a multimedia editing resource may be one or more, and one processor is used as an example in FIG. 5. In some embodiments of the present disclosure, the processor 501, memory 502, input device 503, and output device 504 may be connected via a bus or other means, and the connection via a bus is used as an example in FIG. 5.

The memory 502 may be used to store software programs and modules, and the processor 501 executes various functional applications and data processing of the device for recommending a multimedia editing resource by running the software programs stored in memory 502 and modules. Memory 502 may mainly include a storage program area and a storage data area, where the storage program area may store an operating system, application programs required for at least one function, etc. In addition, memory 502 may include high-speed random access memory and non-volatile memory, such as at least one disk storage device, flash memory device, or other volatile solid-state storage device. Input device 503 may be used to receive input digital or character information and generate signal inputs related to user settings and functional control of the device for recommending a multimedia editing resource.

In the present embodiment, the processor 501 may load executable files corresponding to the process of one or more applications into the memory 502 according to the following instructions, and the application stored in the memory 502 may be run by the processor 501, thereby achieving various functions of the device for recommending a multimedia editing resource.

It should be noted that in this specification, relational terms such as "first" and "second" are only used to distinguish one entity or operation from another entity or operation, which do not necessarily require or imply any actual relationship or order between these entities or operations. Moreover, the terms "including", "comprising", or any other variant thereof are intended to cover non-exclusive inclusion, so that a process, method, article, or device that includes a series of elements not only includes those elements, but also includes other elements not explicitly listed, or includes elements inherent to such a process, method, article, or device. In absence of further limitations, the element defined by the sentence "comprising a . . . " does not exclude the existence of additional identical elements in the process, method, article, or device that includes the element.

The above is only a detailed description of the present disclosure, which enables those skilled in the art to understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to these embodiments described herein, but will conform to the widest scope consistent with the principles and novel features disclosed herein.

We claim:

1. A method for recommending a multimedia editing resource, comprising:

in response to a trigger operation for editing an initial multimedia resource by a user in a first resource recommendation scenario, determining a recommendation analysis object corresponding to the first resource recommendation scenario, wherein the recommendation analysis object comprises at least one of a local album of the user, a record of editing multimedia resources by the user, a record of collecting or utilizing multimedia editing resources by the user;

determining at least one recommendation tag based on the recommendation analysis object, wherein the at least one recommendation tag indicates at least one multimedia editing resource in which the user is interested, and the at least one multimedia editing resource is configured to edit the initial multimedia resource to generate a target multimedia resource; and obtaining the at least one multimedia editing resource that matches the at least one recommendation tag and displaying the at least one multimedia editing resource, wherein the target multimedia resource is presented with an editing effect obtained by applying the at least one multimedia editing resource to the initial multimedia resource.

2. The method according to claim 1, wherein in response to the trigger operation in the first resource recommendation scenario, determining the recommendation analysis object corresponding to the first resource recommendation scenario comprises:

in response to an editing trigger operation for the initial multimedia resource in a multimedia resource editing scenario, determining a target multimedia resource collection corresponding to the user as a recommendation analysis object corresponding to the multimedia resource editing scenario, wherein the target multimedia resource collection includes at least one of a local album, an editing record of multimedia resources, a collection record of multimedia editing resources, or a usage record of multimedia editing resources.

3. The method according to claim 1, wherein determining the at least one recommendation tag by analyzing the multimedia resources corresponding to the recommendation analysis object comprises:

analyzing a first multimedia resource in the multimedia resources corresponding to the recommendation analysis object, and determining the recommendation tag corresponding to the first multimedia resource; and determining at least one recommendation tag corresponding to the user based on the recommendation tag corresponding to the first multimedia resource.

4. The method according to claim 1, wherein each of the at least one recommendation tag has a weight value, the weight value of each of the at least one recommendation tag is configured to represent an interest of the user in a multimedia editing resource with a corresponding recommendation tag, and obtaining the at least one multimedia editing resource that matches the at least one recommendation tag comprises:

obtaining the at least one multimedia editing resource that matches the at least one recommendation tag based on the at least one recommendation tag and weight values corresponding to respective recommendation tags.

5. The method according to claim 4, wherein before obtaining the at least one multimedia editing resource that matches the at least one recommendation tag based on the at least one recommendation tag and the weight values corresponding to respective recommendation tags, the method further comprises:

determining a proportion of quantity of multimedia resources with a second recommendation tag in the at least one recommendation tag corresponding to the user, in the multimedia resources corresponding to the recommendation analysis object; and determining a weight value corresponding to the second recommendation tag based on the proportion of quantity corresponding to the second recommendation tag and a predetermined initial weight value of the second recommendation tag.

6. The method according to claim 4, wherein before obtaining the at least one multimedia editing resource that matches the at least one recommendation tag based on the at least one recommendation tag and the weight values corresponding to respective recommendation tags, the method further comprises:

classifying the multimedia resources corresponding to the recommendation analysis object to obtain a plurality of resource classification sets, wherein the at least one recommendation tag corresponding to the user has a correspondence with the plurality of resource classification sets;

determining a predetermined initial weight value of a resource classification set corresponding to a second recommendation tag in the at least one recommendation tag as a first weight value, wherein the first weight value is configured to represent an interest of the user in the resource classification set;

determining a predetermined initial weight value of the second recommendation tag in the resource classification set as a second weight value, wherein the second weight value is configured to represent an interest of the user in multimedia resources with the second recommendation tag in the resource classification set; and determining a weight value of the second recommendation tag based on the first weight value and the second weight value.

7. The method according to claim 4, wherein before obtaining the at least one multimedia editing resource that matches the at least one recommendation tag based on the at least one recommendation tag and the weight values corresponding to respective recommendation tags, the method further comprises:

determining, based on a collection weight value of a target multimedia resource collection to which multimedia resources with a third recommendation tag in the at least one recommendation tag belong, a weight value corresponding to the third recommendation tag, wherein the target multimedia resource collection includes at least one of a local album, an editing record of multimedia resources, a collection record of multimedia editing resources or a usage record of multimedia editing resources, and each of a collection weight value of the editing record of multimedia resources, a collection weight value of the collection record of multimedia editing resources and a collection weight value of the usage record of multimedia editing resources is greater than a collection weight value of the local album.

8. A non-transitory computer-readable storage medium, wherein the computer-readable storage medium stores instructions that, when executed on a terminal device, cause the terminal device to implement operations, the operations comprising:

in response to a trigger operation for editing an initial multimedia resource by a user in a first resource recommendation scenario, determining a recommendation analysis object corresponding to the first resource recommendation scenario, wherein the recommendation analysis object comprises at least one of a local album of the user, a record of editing multimedia resources by the user, a record of collecting or utilizing multimedia editing resources by the user;

determining at least one recommendation tag based on the recommendation analysis object, wherein the at least one recommendation tag indicates at least one multimedia editing resource in which the user is interested, and the at least one multimedia editing resource is configured to edit the initial multimedia resource to generate a target multimedia resource; and obtaining the at least one multimedia editing resource that matches the at least one recommendation tag and displaying the at least one multimedia editing resource, wherein the target multimedia resource is presented with an editing effect obtained by applying the at least one multimedia editing resource to the initial multimedia resource.

9. The computer-readable storage medium according to claim 8, wherein in response to the trigger operation in the first resource recommendation scenario, determining the recommendation analysis object corresponding to the first resource recommendation scenario comprises:

in response to an editing trigger operation for the initial multimedia resource in a multimedia resource editing scenario, determining a target multimedia resource collection corresponding to the user as a recommendation analysis object corresponding to the multimedia resource editing scenario, wherein the target multimedia resource collection includes at least one of a local album, an editing record of multimedia resources, a collection record of multimedia editing resources, or a usage record of multimedia editing resources.

10. The computer-readable storage medium according to claim 8, wherein determining the at least one recommendation tag by analyzing the multimedia resources corresponding to the recommendation analysis object comprises:

analyzing a first multimedia resource in the multimedia resources corresponding to the recommendation analysis object, and determining the recommendation tag corresponding to the first multimedia resource; and determining at least one recommendation tag corresponding to the user based on the recommendation tag corresponding to the first multimedia resource.

11. The computer-readable storage medium according to claim 8, wherein each of the at least one recommendation tag has a weight value, the weight value of each of the at least one recommendation tag is configured to represent an interest of the user in a multimedia editing resource with a corresponding recommendation tag, and obtaining the at least one multimedia editing resource that matches the at least one recommendation tag comprises:

obtaining the at least one multimedia editing resource that matches the at least one recommendation tag based on the at least one recommendation tag and weight values corresponding to respective recommendation tags.

12. The computer-readable storage medium according to claim 11, wherein before obtaining the at least one multimedia editing resource that matches the at least one recommendation tag based on the at least one recommendation tag and the weight values corresponding to respective recommendation tags, the operations further comprise:

determining a proportion of quantity of multimedia resources with a second recommendation tag in the at least one recommendation tag corresponding to the user, in the multimedia resources corresponding to the recommendation analysis object; and determining a weight value corresponding to the second recommendation tag based on the proportion of quantity corresponding to the second recommendation tag and a predetermined initial weight value of the second recommendation tag.

13. The computer-readable storage medium according to claim 11, wherein before obtaining the at least one multimedia editing resource that matches the at least one recommendation tag based on the at least one recommendation tag and the weight values corresponding to respective recommendation tags, the method further comprises:

classifying the multimedia resources corresponding to the recommendation analysis object to obtain a plurality of resource classification sets, wherein the at least one recommendation tag corresponding to the current user has a correspondence with the plurality of resource classification sets;

determining a predetermined initial weight value of a resource classification set corresponding to a second recommendation tag in the at least one recommendation tag as a first weight value, wherein the first weight value is configured to represent an interest of the current user in the resource classification set;

determining a predetermined initial weight value of the second recommendation tag in the resource classification set as a second weight value, wherein the second weight value is configured to represent an interest of the current user in multimedia resources with the second recommendation tag in the resource classification set; and determining a weight value of the second recommendation tag based on the first weight value and the second weight value.

14. The computer-readable storage medium according to claim 11, wherein before obtaining the at least one multimedia editing resource that matches the at least one recommendation tag based on the at least one recommendation tag and the weight values corresponding to respective recommendation tags, the operations further comprise:

determining, based on a collection weight value of a target multimedia resource collection to which multimedia resources with a third recommendation tag in the at least one recommendation tag belong, a weight value corresponding to the third recommendation tag, wherein the target multimedia resource collection includes at least one of a local album, an editing record of multimedia resources, a collection record of multimedia editing resources or a usage record of multimedia editing resources, and each of a collection weight value of the editing record of multimedia resources, a collection weight value of the collection record of multimedia editing resources and a collection weight value of the usage record of multimedia editing resources is greater than a collection weight value of the local album.

15. A device for recommending a multimedia editing resource, comprising: a memory, a processor, and a computer program stored on the memory and is capable of being run on the processor, wherein the processor, when executing the computer program, implements operations, the operations comprising:

in response to a trigger operation for editing an initial multimedia resource by a user in a first resource recommendation scenario, determining a recommendation analysis object corresponding to the first resource recommendation scenario, wherein the recommendation analysis object comprises at least one of a local album of the user, a record of editing multimedia resources by the user, a record of collecting or utilizing multimedia editing resources by the user;

determining at least one recommendation tag based on the recommendation analysis object, wherein the at least one recommendation tag indicates at least one multimedia editing resource in which the user is interested, and the at least one multimedia editing resource is configured to edit the initial multimedia resource to generate a target multimedia resource; and obtaining the at least one multimedia editing resource that matches the at least one recommendation tag and displaying the at least one multimedia editing resource, wherein the target multimedia resource is presented with an editing effect obtained by applying the at least one multimedia editing resource to the initial multimedia resource.

16. The device according to claim 15, wherein in response to the trigger operation in the first resource recommendation scenario, determining the recommendation analysis object corresponding to the first resource recommendation scenario comprises:

in response to an editing trigger operation for the initial multimedia resource in a multimedia resource editing scenario, determining a target multimedia resource collection corresponding to the user as a recommendation analysis object corresponding to the multimedia resource editing scenario, wherein the target multimedia resource collection includes at least one of a local album, an editing record of multimedia resources, a collection record of multimedia editing resources, or a usage record of multimedia editing resources.

17. The device according to claim 15, wherein determining the at least one recommendation tag by analyzing the multimedia resources corresponding to the recommendation analysis object comprises:

analyzing a first multimedia resource in the multimedia resources corresponding to the recommendation analysis object, and determining the recommendation tag corresponding to the first multimedia resource; and determining at least one recommendation tag corresponding to the user based on the recommendation tag corresponding to the first multimedia resource.

18. The device according to claim 15, wherein each of the at least one recommendation tag has a weight value, the weight value of each of the at least one recommendation tag is configured to represent an interest of the user in a multimedia editing resource with a corresponding recommendation tag, and obtaining the at least one multimedia editing resource that matches the at least one recommendation tag comprises:

obtaining the at least one multimedia editing resource that matches the at least one recommendation tag based on the at least one recommendation tag and weight values corresponding to respective recommendation tags.

19. The device according to claim 18, wherein before obtaining the at least one multimedia editing resource that matches the at least one recommendation tag based on the at least one recommendation tag and the weight values corresponding to respective recommendation tags, the operations further comprise:

determining a proportion of quantity of multimedia resources with a second recommendation tag in the at least one recommendation tag corresponding to the user, in the multimedia resources corresponding to the recommendation analysis object; and determining a weight value corresponding to the second recommendation tag based on the proportion of quantity corresponding to the second recommendation tag and a predetermined initial weight value of the second recommendation tag.

20. The device according to claim 18, wherein before obtaining the at least one multimedia editing resource that matches the at least one recommendation tag based on the at least one recommendation tag and the weight values corresponding to respective recommendation tags, the method further comprises:

classifying the multimedia resources corresponding to the recommendation analysis object to obtain a plurality of resource classification sets, wherein the at least one recommendation tag corresponding to the current user has a correspondence with the plurality of resource classification sets;

determining a predetermined initial weight value of a resource classification set corresponding to a second recommendation tag in the at least one recommendation tag as a first weight value, wherein the first weight value is configured to represent an interest of the current user in the resource classification set;

determining a predetermined initial weight value of the second recommendation tag in the resource classification set as a second weight value, wherein the second weight value is configured to represent an interest of the current user in multimedia resources with the second recommendation tag in the resource classification set; and determining a weight value of the second recommendation tag based on the first weight value and the second weight value.

* * * * *